United States Patent [19]
Kojima et al.

[11] Patent Number: 5,659,528
[45] Date of Patent: Aug. 19, 1997

[54] INFORMATION RECORDING-REPRODUCTION METHOD

[75] Inventors: Kunio Kojima, Nabari; Yoshihiro Sekimoto, Soraku-gun; Yasuo Nakata, Takaichi-gun; Tomoyuki Miyake, Nara; Nobuo Ogata, Shiki-gun; Toshiharu Inui, Yamatokoriyama, all of Japan

[73] Assignee: Sharp Kabushiki Kaisha, Osaka, Japan

[21] Appl. No.: 348,158

[22] Filed: Nov. 28, 1994

[30] Foreign Application Priority Data

Dec. 3, 1993 [JP] Japan ..................................... 5-304454

[51] Int. Cl.$^6$ ........................................................ G11B 5/09
[52] U.S. Cl. ........................... 369/48; 369/54; 369/60; 369/32; 369/93
[58] Field of Search ................................. 369/47, 48, 49, 369/54, 58, 60, 30, 32, 33, 92, 93, 96

[56] References Cited

U.S. PATENT DOCUMENTS 5,199,022  3/1993  Suzuki et al. .

FOREIGN PATENT DOCUMENTS

| 0 293 480 | 12/1988 | European Pat. Off. . |
| 0 543 446 | 5/1993 | European Pat. Off. . |
| 0552806 | 7/1993 | European Pat. Off. . |
| 40 16 553 | 11/1991 | Germany . |
| 42 12 663 | 1/1993 | Germany . |
| 2-61859 | of 1990 | Japan . |
| A-03150765 | 6/1991 | Japan . |
| 2188474 | 9/1987 | United Kingdom . |

OTHER PUBLICATIONS

U.S. application No. 08/271,492, Kojima, filed Jul. 7, 1994.

*Primary Examiner*—P. W. Huber
*Attorney, Agent, or Firm*—Nixon & Vanderhye, P.C.

[57] ABSTRACT

An information recording-reproduction method wherein: upon reproducing, recorded information corresponding to a predetermined number of sectors from the leading sector of each of a plurality of information tracks on an optical disk is preliminarily stored on a buffer memory, and during a period in which the optical pickup is shifted to another information track, the recording information, stored in the buffer memory, is reproduced; and upon recording, during a period in which the optical pickup is shifted to another information track, recording information is temporarily stored in the buffer memory, and after completion of the recording, the recording information is recorded on the optical disk. In this method, information tracks, which are formed on the optical disk discontinuously with one another, are regarded as if they were continuous tracks, and the apparent recording and reproducing operation is carried out continuously.

12 Claims, 9 Drawing Sheets

INFORMATION RECORDING-REPRODUCTION METHOD

FIELD OF THE INVENTION

The present invention, which is applied to, for example, information processing apparatuses, such as magneto-optical-disk recording-reproduction apparatuses using magneto-optical disks and compact-disk reproduction apparatuses, relates to an information recording-reproduction method for recording and reproducing digital information by using a recording medium having a plurality of information tracks formed into spiral shapes.

BACKGROUND OF THE INVENTION

Conventionally, an optical-disk recording-reproduction apparatus has been used for recording and reproducing, for example, digital video information, that is, consecutive digital information. In such an apparatus, for example, as illustrated in FIG. 6, an optical disk 1 is used as a recording medium, whereon information tracks in the shape of spirals are formed discontinuously with each other.

This optical disk is provided with the first spiral information track 26 and the second spiral information track 27, both of which are the information tracks in the shape of spirals. For example, the CLV (Constant Linear Velocity) system is adopted for its recording format.

Moreover, for example, as illustrated in FIG. 9, recording and reproducing operations are available in the above-mentioned apparatus. Upon recording, analog video information is inputted through an input terminal 124, and is converted into digital video information in an A/D converter 114.

The digital video information, made through the conversion, is inputted to an information-compression processing circuit 120. In circuit 120, an information-compressing operation is carried out, wherein, for example, an original of data, approximately 160M bps (bit per second), which has been converted to digital video information of the current television signal (NTSC system), is compressed into a compressed amount of data, approximately 5M bps.

The information, thus compressed, is further converted into a form suitable for recording in a recording-data processing circuit 111, and is applied to a coil 104 through a coil driver 105. Thus, the coil 104 applies a modulated magnetic field corresponding to the recording information to an optical disk 1.

Meanwhile, upon receipt of an instruction from a controller 116, a laser driver 106 allows an optical pickup 103 to project a light beam of high power onto the optical disk 1, and the temperature of the optical disk 1 is thus raised locally so as to allow desired information to be recorded thereon.

Additionally, absolute addresses are preliminarily recorded on the optical disk 1 as prior information, and the information obtained through the optical pickup 103 is inputted to a prior-information detection circuit 108 through the reproduction amplifier 107, and part of the information is directed to a CLV circuit 110. In accordance with the information thus inputted, CLV control is executed so that a spindle motor 102 provides a constant linear velocity at a position on the optical disk 1 to which the light beam is being projected.

Further, part of the information from the prior-information detection circuit 108 is also inputted to an absolute-address detection circuit 109, thereby allowing the controller 116 to have the positional information of the optical pickup 103.

Upon reproduction, the optical pickup 1030 is allowed to access a recording area containing information in question. Thus, the information, which was recorded on the optical disk 1, is read out by the optical pickup 103, and directed to a reproduced-data processing circuit 112 through a reproduction amplifier 107.

The reproduced-data processing circuit 112 converts the inputted information into compressed digital information that is a form prior to a recording-data processing, and sends it to an information-decompression processing circuit 121. The digital video information, decompressed in the information-decompression processing circuit 121, is converted into analog video information in the D/A converter 115, and released from an output terminal 125.

Instructions as to the recording and reproduction are entered through an operation section 117, and converted into control signals for various sections in the controller 116. Further, the current positional information and operational state of the optical pickup 103 are displayed on a display section 118 under control of the controller 116.

Here, in the case of recording or reproducing digital information on or from the optical disk 1 by using the optical-disk recording-reproduction apparatus having the above-mentioned arrangement, since the first and second spiral information tracks are formed on the optical disk 1 discontinuously with each other, as shown in FIG. 6, the information recording or reproducing operation is interrupted when the operation is executed over the respective tracks. For example, while the optical pickup 103 moves from the first spiral information track 26 to the second spiral information track 27, the information recording or reproducing operation is interrupted.

In other words, since the optical pickup 103 records or reproduces digital information on or from the optical disk 1 in real time, a period during which the optical pickup 103 is moving from the first spiral information track 26 to the second spiral information track 27 on the optical disk 1 is regarded as an accessing operation period, wherein it is this makes it impossible to conduct the recording or reproducing operation.

For example, if one information track enables a recording or reproducing operation corresponding to video information of 30 minutes, the optical disk 1 having two tracks, that is, the first and second spiral information tracks 26 and 27, are supposed to provide a recording or reproducing operation of 30×2 minutes. However, since the respective tracks are formed discontinuously with each other, it is not possible to conduct the recording or reproducing operation for video information of 60 minutes continuously without interruptions.

The problem is that it is not possible to conduct a recording or reproducing operation continuously without interruptions with respect to a plurality of information tracks formed into spiral shapes discontinuously with one another.

SUMMARY OF THE INVENTION

The present invention has been devised in order to solve the above-mentioned problem, and its object is to provide an information recording-reproduction method wherein a plurality of discontinuous information tracks having spiral shapes are regarded as continuous tracks, and continuous recording of digital information is available with respect to those information tracks having spiral shapes.

Another object of the present invention is to provide an information recording-reproduction method whereby continuous reproduction of digital information is available with respect to each of those information tracks having spiral shapes.

In order to achieve the above object, in the information recording-reproduction method of the present invention, when a recording-reproduction means records continuous digital information on a recording medium having a plurality of information tracks formed into spiral shapes discontinuously with one another in a manner crossing over two of the information tracks, recording information corresponding to a shifting time of the recording-reproduction means from the first information track to the second information track is temporarily stored in a storage means, and then recorded on the second information track.

In accordance with the above-mentioned method, when on recording the recording-reproduction means, such as an optical pickup, is shifted from the first information track to the second information track, the storage means temporarily stores recording information to be recorded on the recording medium during the shifting time of the recording-reproduction means; therefore, the apparent recording operation continues even during the shifting time of the recording-reproduction means.

This method makes it possible to carry out the recording operation continuously without interruptions of the operation. Thus, it is possible to improve the efficiency of the recording operation as well as improving the operability of the apparatus.

In order to achieve another object of the present invention, in the information recording-reproduction method of the present invention, when the recording-reproduction means reproduces continuous digital information from a recording medium having a plurality of information tracks formed into spiral shapes discontinuously with one another, with the digital information being recorded in a manner crossing over the first and second information tracks, recording information located in predetermined address sections on the second information track is preliminarily stored in the storage means, and during the shifting time from the first information track to the second information track, the recording information stored in the storage means is reproduced.

In accordance with the above-mentioned method, when upon reproduction, the recording-reproduction means, such as an optical pickup, is shifted from the first information track to the second information track, the recording information preliminarily stored in the storage means is reproduced during the shifting time of the recording-reproduction means; therefore, it is possible to continuously carry out the reproduction operation without interruptions of the operation even in the case of carrying out the reproducing operation in a manner crossing over the information tracks.

This method makes it possible to carry out the reproducing operation continuously even during the shifting time of the recording-reproduction means such as an optical pickup, thereby providing a continuous reproducing operation. Thus, it is possible to improve the efficiency of the reproducing operation as well as improving the operability of the apparatus.

For a fuller understanding of the nature and advantages of the invention, reference should be made to the ensuing detailed description taken in conjunction with the accompanying drawings.

DESCRIPTION OF THE EMBODIMENTS

Embodiment 1

Referring to FIGS. 1 through 6, the following description will discuss one embodiment of the present invention.

Figure 1:
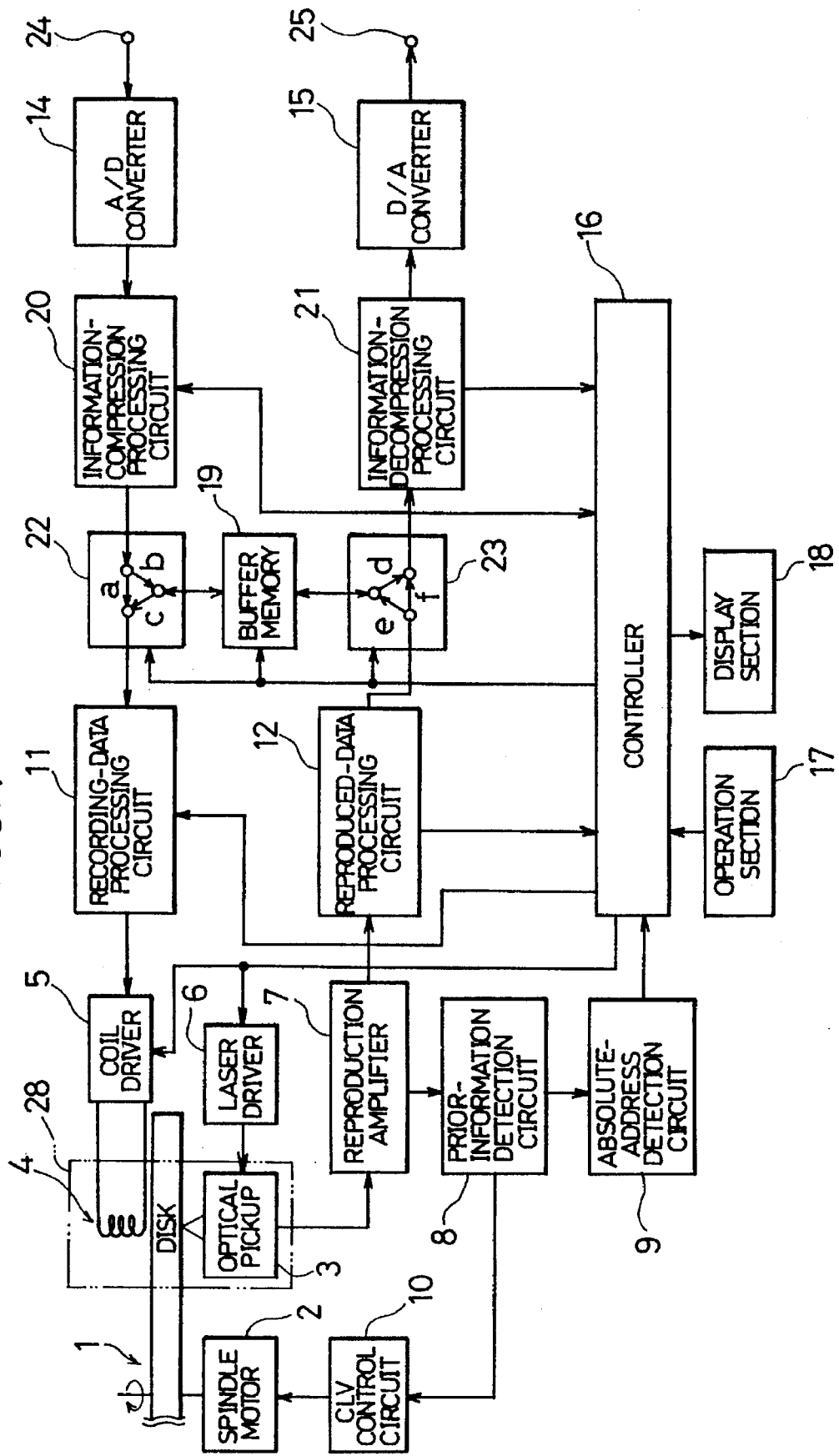
FIG. 1 is a block diagram showing a construction of an optical-disk recording-reproduction apparatus wherein one embodiment of the information recording-reproduction method of the present invention is adopted.

The information recording-reproduction method of the present invention is preferably adopted in an information recording-reproduction apparatus, such as an optical-disk recording-reproduction apparatus. As illustrated in FIG. 1, the above-mentioned apparatus is provided with: a coil 4 for applying a modulated magnetic field corresponding to recording information onto an optical disk 1 that functions as a recording medium; a recording-data processing circuit 11, a buffer memory 19 that functions as a storage means; and an information-compression processing circuit 20.

Further, the above-mentioned apparatus is also provided with an optical pickup 3 for projecting a light beam for use in recording and reproduction onto the optical disk 1; a reproduction amplifier 7; and a controller 16 for controlling the above-mentioned respective parts. Here, the above-mentioned light beam is a laser beam.

In the above-mentioned apparatus, the coil 4 and the optical pickup 3 constitute a recording-reproduction means 28, and the recording and reproducing operations are carried out by the recording-reproduction means 28 on and from the optical disk 1.

Here, as to the optical disk 1, the CLV (Constant Linear Velocity) system is adopted as the recording format. Moreover, absolute addresses are preliminarily recorded on the optical disk 1 as prior information, and information obtained through the optical pickup 3 is inputted to a prior-information detection circuit 8 through the reproduction amplifier 7, and part of the information is directed to a CLV control circuit 10.

In the CLV circuit 10, CLV control is executed based on the inputted information so that a spindle motor 2 is rotated at a constant linear velocity. Moreover, the information from the prior-information detection circuit 8 is also inputted to an absolute-address detection circuit 9, and positional information as to the point being irradiated by the light beam on the optical disk 1 is sent from the absolute-address detection circuit 9 to the controller 16.

Figure 2:
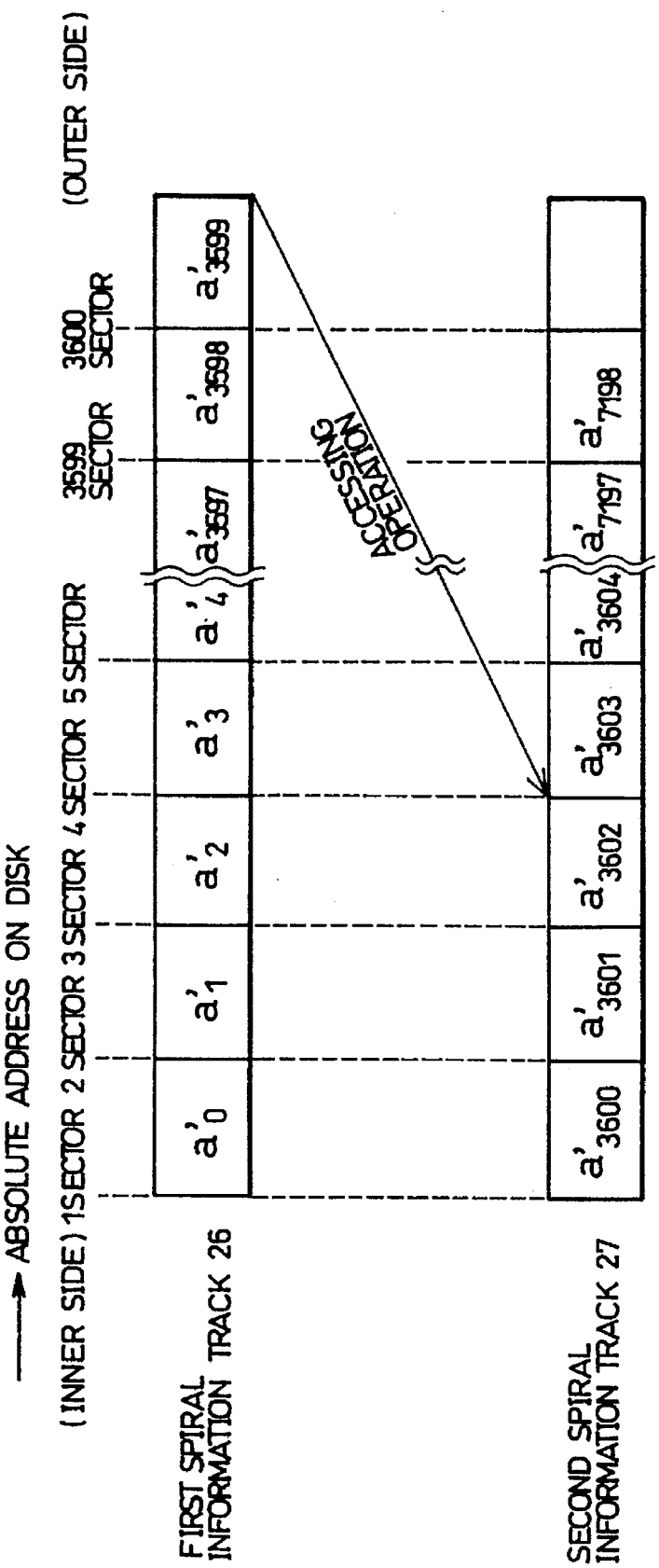
FIG. 2 is an explanatory drawing of a sequence of reproducing processes according to a method of the invention.
Figure 3:
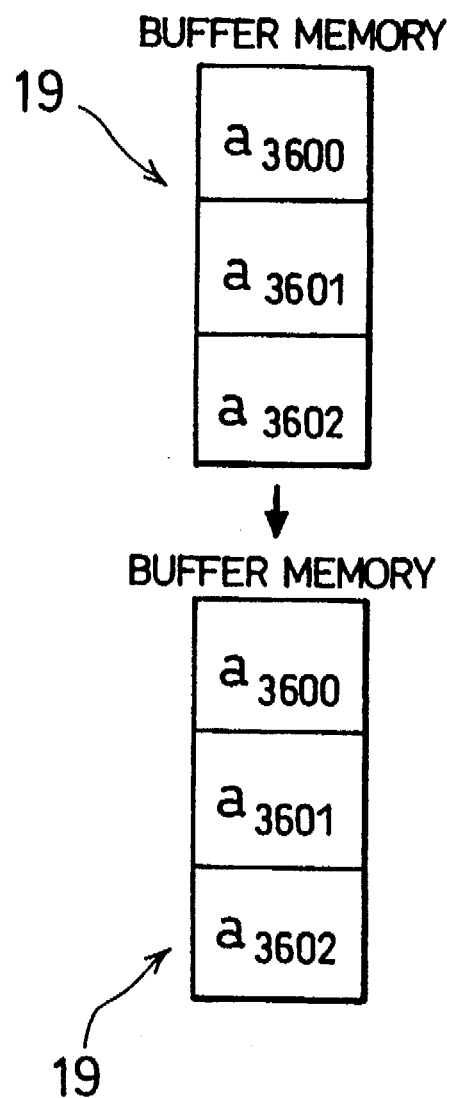
FIG. 3 is an explanatory drawing of a sequence of reproducing processes according to a method of the invention.
Figure 6:
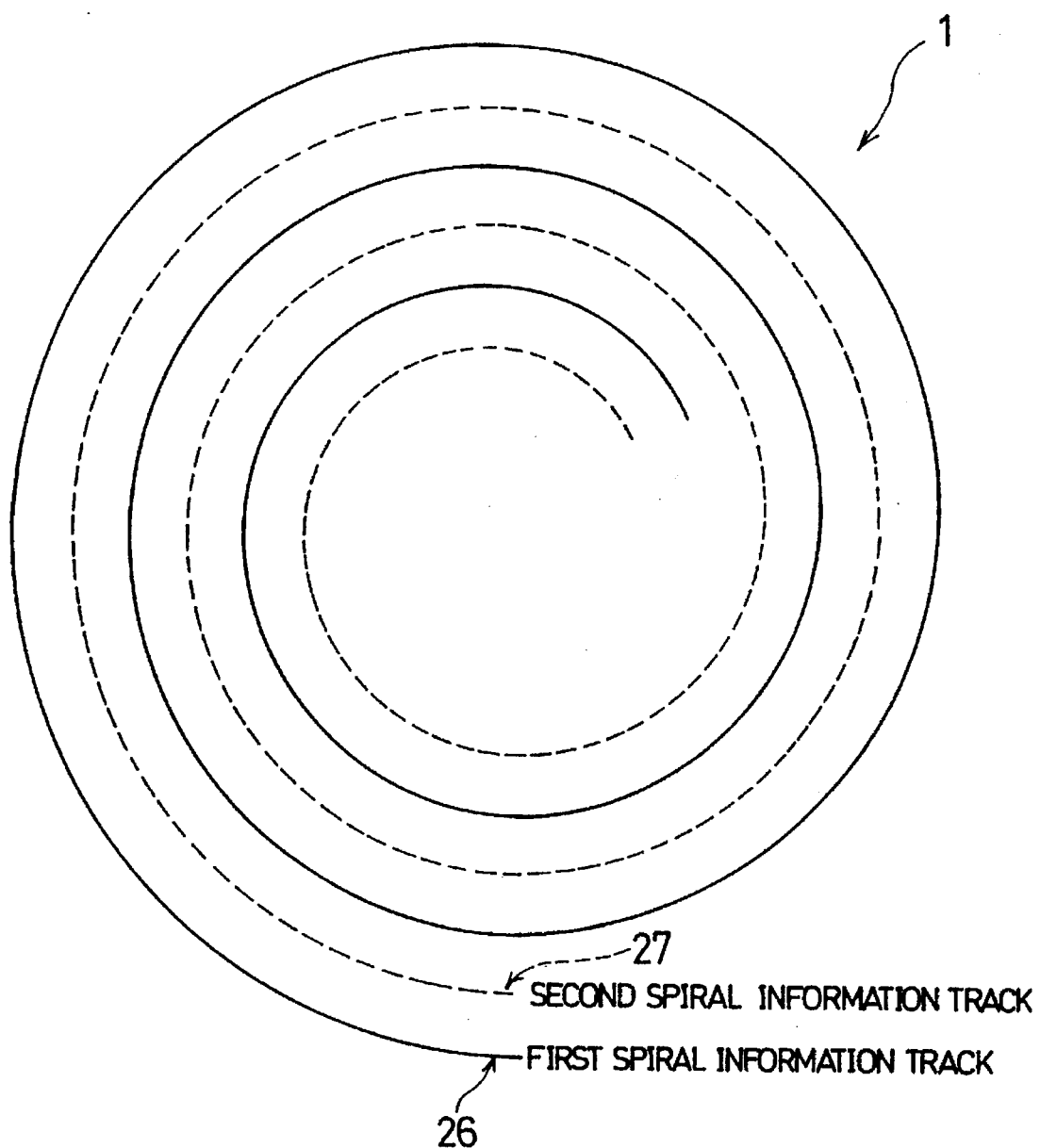
FIG. 6 is a schematic plan view of an optical disk that is used in according to a method of the invention.

Referring to FIGS. 1 through 3, the following description will discuss a method for reproducing information recorded on the optical disk 1 by using the above-mentioned apparatus. Here, as shown in FIG. 6, the optical disk 1, which is used in the present embodiment, is provided with the first spiral information track 26 and the second spiral information track 27 that are respectively formed thereon as information tracks in the shape of spirals, in the same direction from inside toward outside. Additionally, the present embodiment will discuss the case where a reproducing operation is continuously carried out from the first spiral information track 26 to the second spiral information track 27 on the optical disk 1.

As shown in FIG. 2, the first and second spiral information tracks 26 and 27 are respectively divided into units having a predetermined amount of recording. Here, each divided unit is referred to as a sector, and the capacity of storage in one sector is set to 320k bytes (more specifically, 327,680 bytes). Therefore, supposing that the data capacity of compressed digital video information is approximately 5 Mbps, a video reproducing operation of 0.5 second is carried out in one sector: for example, supposing that 3600 sectors are formed on one information track, it is possible to perform a video reproducing operation of 30 minutes.

Moreover, in the above-mentioned optical disk 1, beginning with the first sector of the absolute addresses in the first spiral information track 26, recorded information has been located at $a'_0, a'_1 a'_2, \ldots, a'_{3597}, a'_{3598}$, and $a'_{3599}$, and successively beginning with the first sector of the absolute addresses in the second spiral information track 27, recorded information has been located at $a'_{3600}, a'_{3601}, a'_{7197}$, and $a'_{7198}$.

Furthermore, as shown in FIG. 3, compressed digital information, $a_{3600}, a_{3601}$, and $a_{3602}$, which corresponds to the recorded information of the leading three sectors, $a'_{3600}, a'_{3601}$, and $a'_{3602}$, in the second spiral information track 27, is preliminarily recorded in the buffer memory 19. Here, supposing that the capacity of storage in the buffer memory 19 corresponding to three sectors is virtually 1M byte, the time which is taken for the buffer memory 19 to release all the compressed digital information stored therein is equivalent to 1.5 seconds of video reproducing time.

When information is reproduced from the optical disk 1, an instruction for carrying out the reproducing operation is first given to the controller 16 through the operation section 17 shown in FIG. 1. The controller 16 gives an instruction so that the optical pickup 3 accesses, for example, 1st sector of the absolute addresses located on the first spiral information track 26 on the optical disk 1, closes a signal path f of a switcher 23 for reproduction-use, and allows the display section 18 to display the states of reproducing operation, such as the reproducing time and the reproduced information number.

Next, the optical pickup 3 accesses the 1st sector of the absolute addresses located on the first spiral information track 26 on the optical disk 1, thereby starting to read the recorded information $a'_0$. The recorded information $a'_0$ thus read is sent to the reproduced-data processing circuit 12 through the reproduction amplifier 7. The recorded information $a'_0$ is converted into compressed digital information $a_0$ in the reproduced-data processing circuit 12, and sent to the switcher 23 for reproduction-use. This compressed digital information $a_0$ is sent to an information-decompression processing circuit 21 through the signal path f of the switcher 23 for reproduction-use, where it is decompressed to return to the video information. The video information is further converted into the original analog video signal in a D/A converter 15, and is released from the output terminal 25.

Successively, the optical pickup 3 reads the recorded information $a'_1, a'_2, a'_3 \ldots$ in the 2nd sector and thereafter of the absolute addresses located on the first spiral information track 26. The information thus read out is converted into an analog video signal in the same manner as described above, and released from the output terminal 25.

Then, after a lapse of about 30 minutes, the optical pickup 3 has completed reading the recorded information $a'_{3599}$ in the 3600th sector that is the last sector of the first spiral information track 26.

At this time, the controller 16, upon recognizing the fact that the recorded information $a'_{3599}$ has been read out according to a signal from the absolute-address detection circuit 9, closes a signal path d in the switcher 23 for reproduction-use, thereby sending the compressed digital information $a_{3600}, a_{3601}$, and $a_{3602}$ stored in the buffer memory 19 to the information-decompression processing circuit 21 successively.

Then, the controller 16 gives an instruction so that the optical pickup 3 starts to make an access toward the 4th sector of the absolute addresses on the second spiral information track 27. In response to this instruction, the optical pickup 3 makes a nearly full-stroke access from the last sector on the first spiral information track 26 that is located at virtually the outermost side of the optical disk 1 toward the 4th sector on the second spiral information track 27 that is located at virtually the innermost side of the optical disk 1. In this case, the time required for this accessing operation is virtually in the order of 1 second including the time required for the rotation control for the spindle motor 2.

In the mean time, the compressed digital information $a_{3600}, a_{3601}$ and $a_{3602}$, stored in the buffer memory 19, is successively decompressed to return to the digital video information in the information-decompression processing circuit 21, and converted into the original analog video signal in the D/A converter 15, thereby being released from the output terminal 25. As described earlier, the reproducing time of the video signal derived from the compressed digital information $a_{3600}, a_{3601}$ and $a_{3602}$ stored in the buffer memory 19 is virtually 1.5 seconds; therefore, the accessing operation of the optical pickup 3 is completed by the time when the analog video signal corresponding to the compressed digital information stored in the buffer memory 19 has been reproduced.

At the time when the compressed digital information $a_{3602}$ has passed the switcher 23 for reproduction-use, the controller 16 closes the signal path f of the switcher 23 for reproduction-use again. The recognition for this passage is made by using a rear-end code, such as an absolute address code, that is added to the rear-end of the compressed digital information $a_{3602}$. Thereafter, the pickup 3, which has reached the 4th sector of the absolute addresses on the second spiral information track 27, starts to read the recorded information $a'_{3603}, a'_{3604} \ldots$ successively.

As described above, when recorded information is reproduced from the optical disk 1, that is, starting from the first spiral information track 26 over to the second spiral information track 27, the recorded information located from the 1st sector to the 3rd sector of the absolute addresses on the second spiral information track 27, which has been preliminarily stored in the buffer memory 19, is reproduced during the period in which the reproducing operation is switched from the first spiral information track 26 to the second spiral information track 27, that is, during the period of accessing operation of the optical pickup 3. This makes it possible to eliminate an interruption in the reproducing operation that might occur during the period of accessing operation of the optical pickup 3.

Consequently, when video signals are reproduced, starting with the first spiral information track 26 over to the second spiral information track 27, it is possible to reproduce the signals continuously without an interruption, thereby improving the operability of the apparatus.

Figure 4:
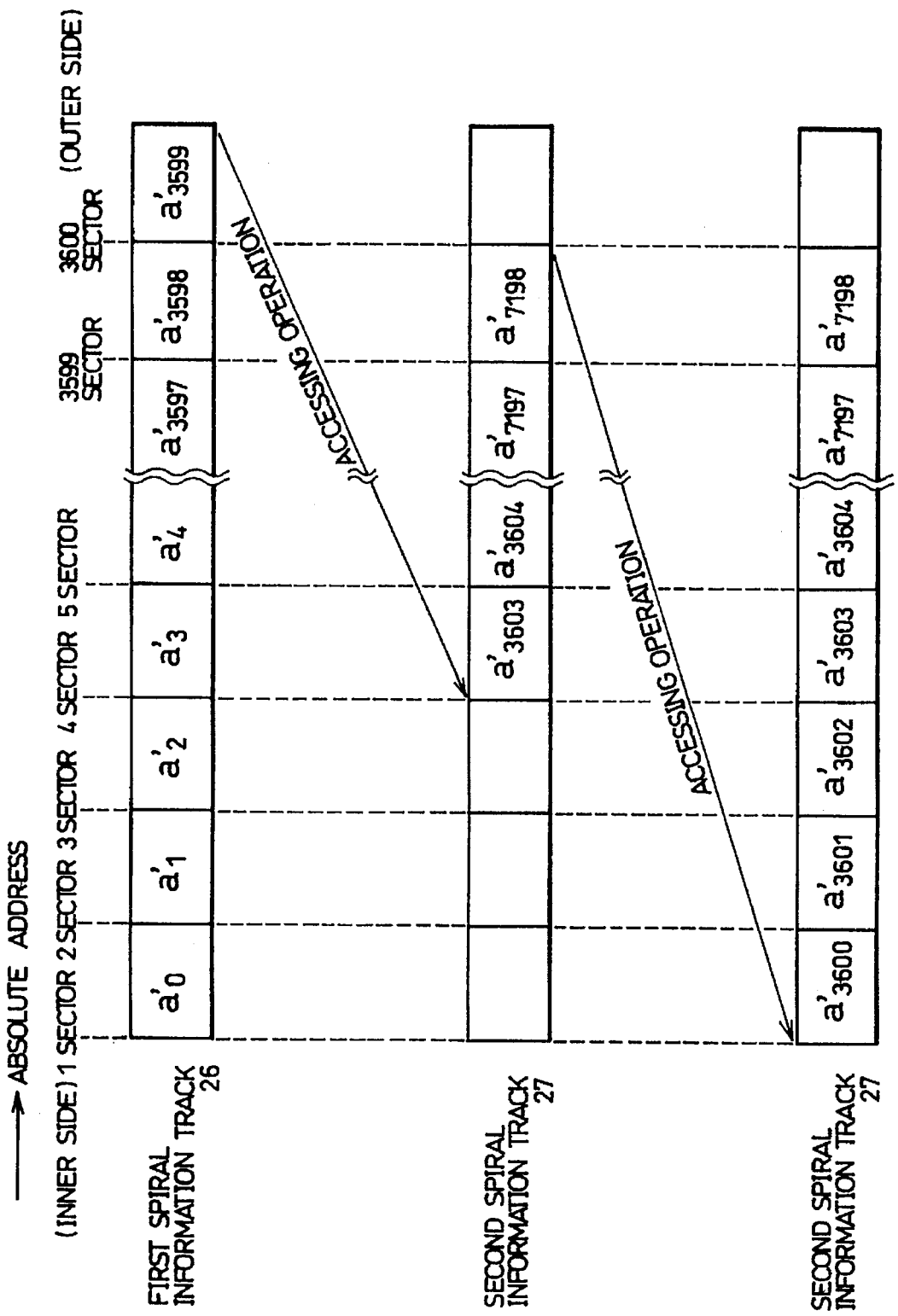
FIG. 4 is an explanatory drawing of a sequence of recording processes according to a method of the invention.
Figure 5:
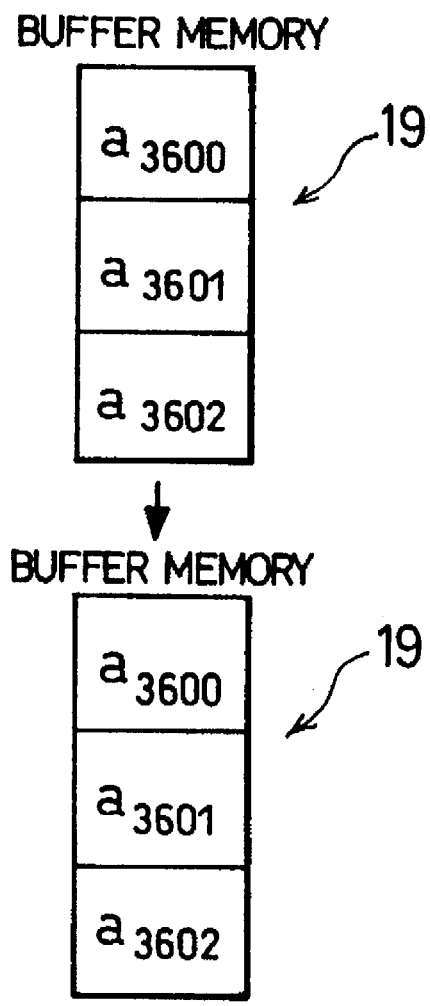
FIG. 5 is an explanatory drawing of a sequence of recording processes according to a method of the invention.

Referring to FIGS. 1, 4, and 5, the following description will discuss a method for recording information on the optical disk 1 by using the above-mentioned apparatus. Here, the present explanation will given on the case where a recording operation is continuously carried out from the first spiral information track 26 to the second spiral information track 27 on the optical disk 1.

First, an instruction for carrying out the recording operation is first given to the controller 16 through the operation section 17. The controller 16 gives an instruction so that the optical pickup 3 accesses, for example, the 1st sector of the absolute addresses located on the first spiral information track 26 on the optical disk 1, and closes a signal path a of a switcher 22 for recording-use.

Further, the controller 16 allows the display section 18 to display the states of recording operation, such as the recording time and the recording information number. At this time, the optical pickup 3 makes an access to the 1st sector of the absolute addresses on the first spiral information track 26, and then enters the stand-by state.

Meanwhile, an analog video signal, which is to be recorded, is inputted through the input terminal 24, and is converted into digital video information in an A/D converter 14. The digital video information thus converted is sent to an information-compression processing circuit 20, where it is divided into respective blocks and compressed into compressed digital information $a_0$, $a_1$, $a_2$, $a_3$, $a_4$, . . . successively.

Further, the compressed digital information is sent to the recording-data processing circuit 11 through the signal path a of the switcher 22 for recording-use. In the recording-data processing circuit 11, the compressed digital information, $a_0$, $a_1$, $a_2$, $a_3$, $a_4$, . . . , is converted into recording information, $a'_0$, $a'_1$, $a'_2$, $a'_3$, $a'_4$, . . . , that has a suitable form for recording. Then, it is applied to the coil 4 through the coil driver 5, and a modulated magnetic field corresponding to the recording information $a'_0$ is applied onto the optical disk 1 by the coil 4.

At this time, upon receipt of an instruction from the controller 16, the optical pickup 3 projects a light beam of high power onto the optical disk 1 through the laser driver 6, and the temperature of the optical disk 1 is thus raised locally so that the desired information, that is, the recording information $a'_0$, is recorded on the 1st sector of the absolute addresses on the first spiral information track 26, as shown in FIG. 4.

In this manner, the information-recording operation is carried out from the 1st sector of the absolute addresses on the first spiral information track 26, and thereafter, in the same manner as described above, the compressing process and the recording operation of the information are successively carried out.

After a lapse of approximately 30 minutes, the optical pickup 3 has completed the recording operation of the recording information $a'_{3599}$ at the 3600th sector that is the last sector on the first spiral information track 26. At this time, the controller 16, upon recognizing the fact that the compressed digital information $a_{3599}$ has passed through the signal path A of the switcher 22 for recording-use, closes a signal path h in the switcher 22 for recording-use.

Therefore, from this time on, the compressed digital information, generated in the information-compression processing circuit 20, is stored in the buffer memory 19 through the signal path b of the switcher 22 for recording-use.

Moreover, the controller 16 gives an instruction so that the optical pickup 3, which has completed the recording operation of the recording information starts to make an access to the 4th sector of the absolute addresses on the second spiral information track 27.

In response to this instruction, the optical pickup 3 makes a nearly full-stroke access from the last sector on the first spiral information track 26 that is located at virtually the outermost side of the optical disk 1 toward the 4th sector on the second spiral information track 27 that is located at virtually the innermost side of the optical disk 1. In this case, the time required for this accessing operation is virtually in the order of 1 second including the time required for the rotation control for the spindle motor 2.

In the mean time, as shown in FIG. 5, the compressed digital information $a_{3600}$, $a_{3601}$ and $a_{3602}$, is successively stored in the buffer memory 19. As described earlier, the capacity of the buffer memory 19 is equivalent to three sectors; therefore, the buffer memory 19 provides approximately 1.5 seconds in terms of the recording time for analog video signals. Thus, the accessing operation of the optical pickup 3 is completed by the time when the analog video signal corresponding to the three sectors has been recorded.

Moreover, the controller 16, upon recognizing the fact that the compressed digital information $a_{3602}$ has passed the signal path b of the switcher 22 for recording-use by using the rear-end code or other means of the information $a_{3602}$, closes again the signal path a of the switcher 22 for recording-use. Therefore, from this time on, the compressed digital information, generated in the information-compression processing circuit 20, is sent to the recording-data processing circuit 11 through the signal path a of the switcher 22 for recording-use.

Furthermore, the optical pickup 3 has completed the accessing operation to the 4th sector of the absolute addresses on the second spiral information track 27, and resumes the recording operation of the recording information $a'_{3603}$, $a'_{3604}$, . . . , successively from the 4th sector of the absolute addresses. Thereafter, in the same manner as described above, the compressing process and the recording operation of the information are successively carried out.

Next, an explanation will be given on a method for ending the recording operation.

When an instruction for stopping the recording operation is entered to the controller 16 through the operation section 17, the controller 16 first gives an instruction so that the optical pickup 3 completes the recording operation. Here, the optical pickup 3 records, for example, the last recording information $a'_{7198}$ on the 3599th sector of the absolute addresses on the second spiral information track 27, thereby completing the recording operation temporarily.

Further, the controller 16 gives an instruction so that the optical pickup 3 starts to make an access to the 1st sector of the absolute addresses on the second spiral information track 27. At this time, the controller 16 closes the signal path c of the switcher 22 for recording-use.

Moreover, the optical pickup 3 makes a nearly full-stroke access from the 3599th sector of the absolute addresses on the second spiral information track 27 that is located at virtually the outermost side of the optical disk 1 toward the 1st sector of the absolute addresses on the second spiral information track 27 that is located at virtually the innermost side of the optical disk 1. In this case, the time required for this accessing operation is virtually in the order of 1 second including the time required for the rotation control for the spindle motor 2. However, different from the accessing operation described earlier, there is no time-wise restriction because the inputting operation of the analog video signal has already been completed.

When the controller 16 recognizes that the optical pickup 3 has made an access to the 1st sector of the absolute addresses on the second spiral information track 27 through a signal from the absolute-address detection circuit 9, such as an absolute-address signal, it successively sends the compressed .digital information $a_{3600}$, $a_{3601}$ and $a_{3602}$ corresponding to the three sectors that is stored in the buffer memory 19 to the recording-data processing circuit 11 through the signal path c of the switcher 22 for recording-use. Therefore, the recording information $a'_{3600}$, $a'_{3601}$ and $a'_{3602}$, generated in the recording-data processing circuit 11, is successively sent to the coil driver 5.

Then, after having recorded the information from the 1st sector to the 3rd sector of the absolute addresses, that is, after having recorded all the information stored in the buffer memory 19, the optical pickup 3 completes the sequence of recording operation.

As described above, while upon recording, the optical pickup 3 carries out accessing operations to the first and second spiral information tracks 26 and 27, recording information, which is to be recorded on the optical disk 1, is preliminarily recorded on the buffer memory 19 temporarily; therefore, the apparent recording operation is regarded as a continuous operation that is carried out even during the accessing operation of the optical pickup 3. This method makes it possible to carry out the recording operation continuously without interruptions of the operation.

Therefore, upon recording or reproducing information, the recording or reproducing operation is carried out continuously even during the shifting time of the optical pick-up 3, thereby improving the efficiency of the recording and reproducing operations. Thus, it becomes possible to improve the operability of the apparatus.

Next, the following description will discuss the rotation control of the optical disk 1.

As described earlier, in the optical disk 1 of the present embodiment, both the first spiral information track 26 and the second spiral information track 27 are formed from the inside toward the outside on the optical disk 1 so as to be used in the CLV control system. In other words, the rotation direction of the optical disk 1 is always kept in the same direction.

Thus, as described above, the spindle motor 2, shown in FIG. 1, is controlled under the CLV control system. In other words, the spindle motor 2 is controlled so as to provide a constant linear velocity by the prior-information detection circuit 8 and the CLV control circuit 10 using one part of information of the absolute addresses that are preliminarily recorded on the optical disk 1 as prior information.

For this reason, in the above-mentioned optical disk 1, when the optical pickup 3 makes an access from the last sector on the first spiral information track 26 toward the leading sector on the second spiral information track 27, it makes a nearly full-stroke access from the outermost information track to the innermost information track. In this case, the time required for this accessing operation is virtually in the order of 1 second including the time required for the rotation control for the spindle motor 2; this is shorter than 1.5 seconds that is the time required for video information corresponding to the capacity of storage in the buffer memory 19.

In contrast, for example, in the case of forming the first spiral information track 26 from the inside toward the outside, while forming the second spiral information track 27 from the outside toward the inside, the accessing operation of the optical pickup 3 between the spirals is finished in several hundreds milliseconds because it is carried out between the outermost tracks.

In this case, however, since it is necessary to reverse the rotation direction of the optical disk 1, the rotation of the spindle motor 2 needs to be first stopped, and then started in the reversed direction. For this reason, it takes at least more than three seconds to reverse the rotation direction of the optical disk 1 and achieve the predetermined CLV control; therefore, the capacity of storage that is needed in the buffer memory 19 is twice as much as that of the present embodiment.

As described above, it is preferable to form tracks on the optical disk 1 in the same direction so as to have the same rotation direction of the spindle motor 2. In this arrangement, it is not necessary to provide the time required for reversing the spindle motor 2, and it is only necessary to take into account the accessing time of the optical pickup 3 and the time required for controlling the rotation speed of the spindle motor 2. This arrangement minimizes the amount of data that is required in switching tracks upon recording or reproducing operation and makes it possible to reduce the capacity of storage in the buffer memory 19.

Additionally, in the present embodiment, the optical disk 1 whereon tracks are formed from the inside toward the outside is adopted; however, another optical disk whereon tracks are formed in the shape of spirals from the outside toward the inside may be adopted, as long as the information tracks are formed in the same direction.

Moreover, in the present embodiment, sectors are formed on the optical disk 1 for use in the CLV system. However, the present invention is not intended to be limited to this arrangement; for example, the CAV (Constant Angular Velocity) system may be adopted in the present invention. In this case, it becomes possible to simplify the circuit construction and miniaturize the spindle motor.

Embodiment 2

Figure 7:
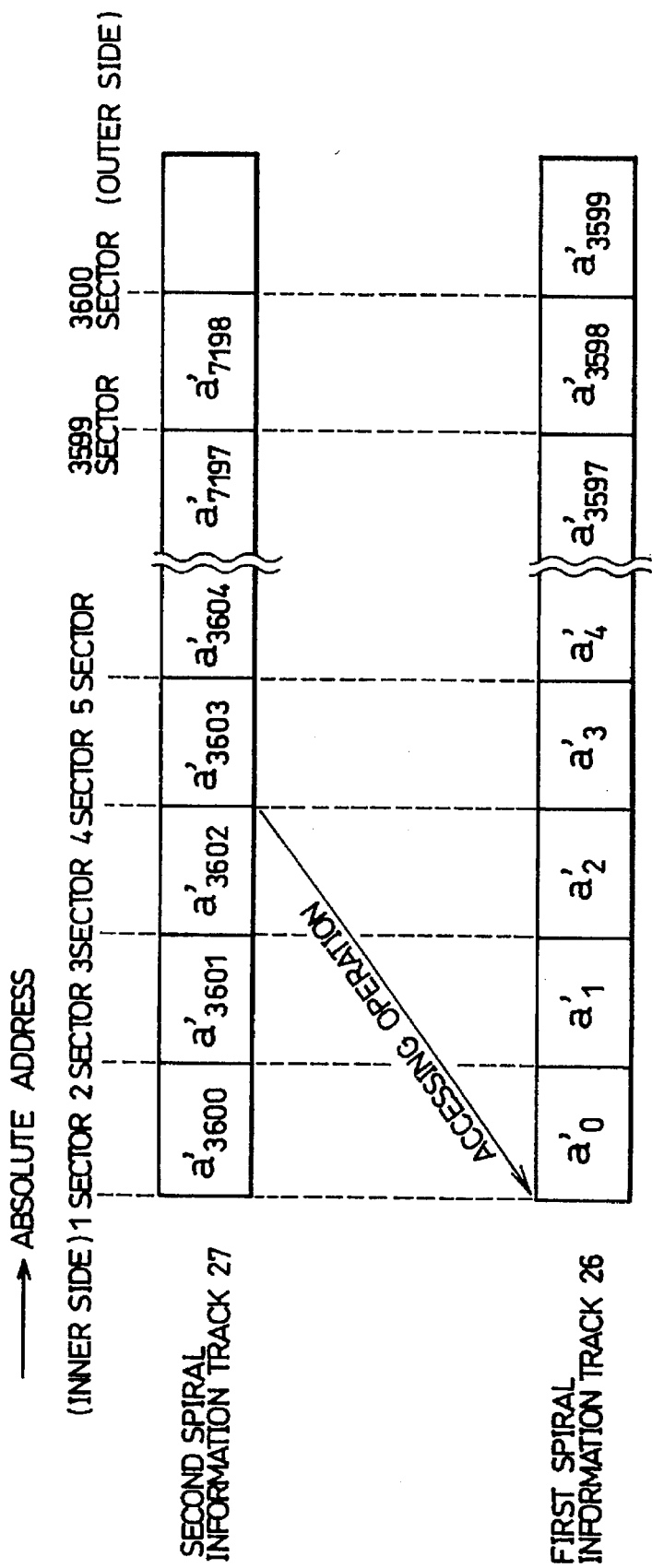
FIG. 7 is an explanatory drawing of a sequence of reproducing processes in an information recording-reproduction method in another embodiment of the present invention.
Figure 8:
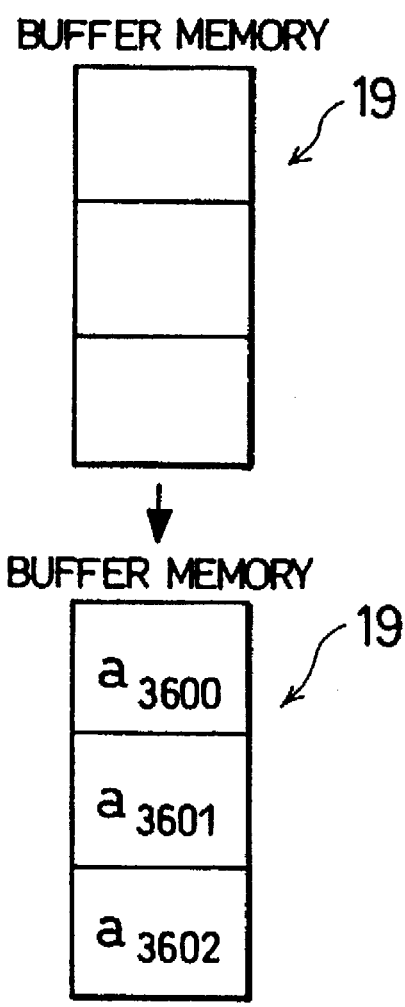
FIG. 8 is an explanatory drawing of the above-mentioned sequence of reproducing processes.
Figure 9:
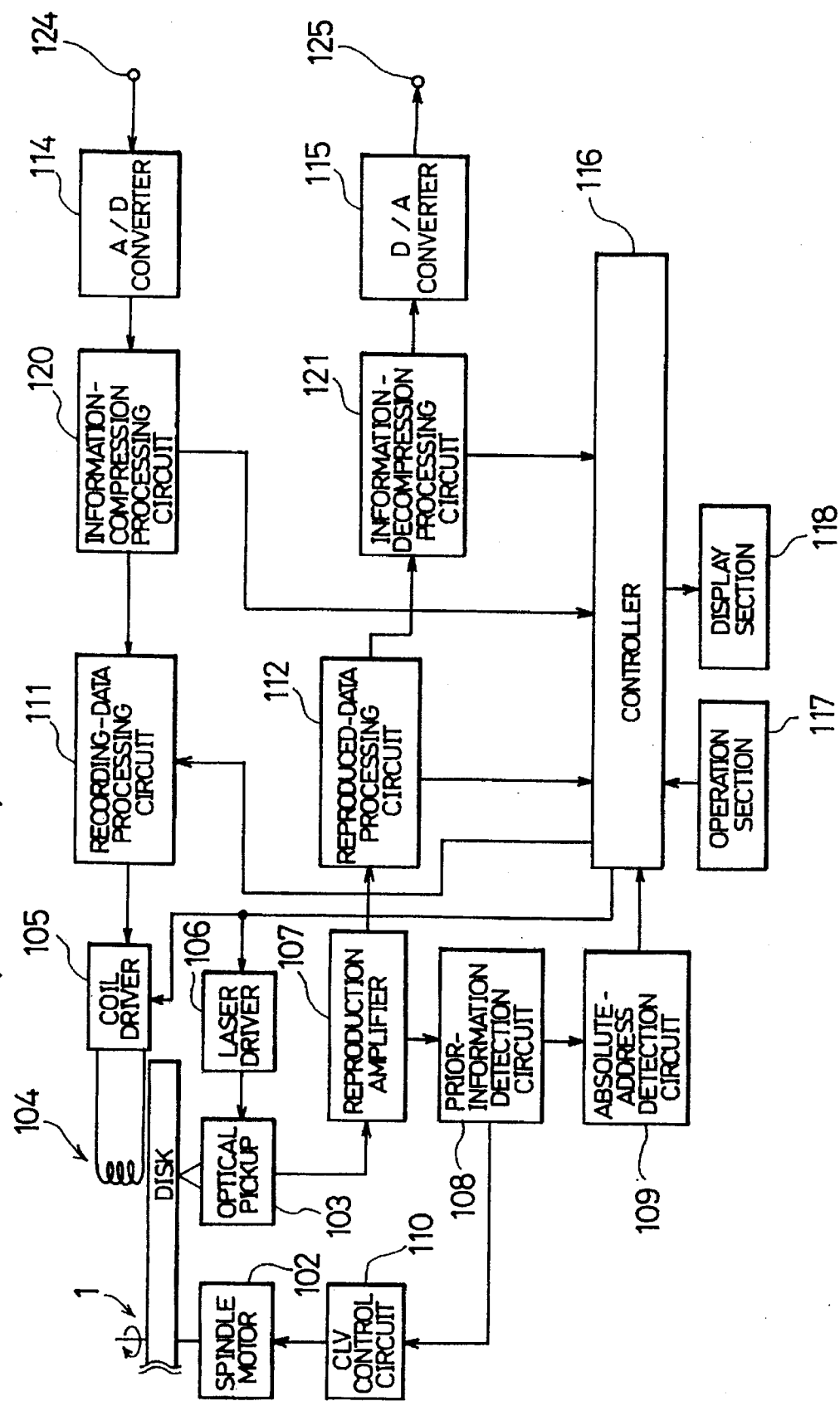
FIG. 9 is a block diagram showing a construction of an optical-disk recording-reproduction apparatus wherein a conventional information recording-reproduction method is carried out.

Referring to FIGS. 1, 7 and 8, the following description will discuss another embodiment of the present invention. Here, those members that have the same functions and that are described in above-mentioned embodiment are indicated by the same reference numerals and the description thereof is omitted. Further, an explanation will be given by exemplifying a case where an reproducing operation is carried out successively from the first spiral information track 26 over to the second spiral information track 27 on the optical disk 1.

In the present embodiment, the storing operation, wherein recorded information located from the 1st sector to the 3rd sector of the absolute addresses on the second spiral information track 27 on the optical disk 1 is preliminarily stored in the buffer memory 19, is carried out upon activating the apparatus prior to the reproducing operation.

Upon activating the apparatus, the controller 16 gives an instruction so that the optical pickup 3 accesses the 1st sector of the absolute addresses located on the second spiral information track 27 on the optical disk 1. At this time, the optical pickup 3, which is located at the innermost position on the optical disk 1 in its stand-by state at the home position, starts making an access to the 1st sector of the absolute addresses located on the second spiral information track 27. In this case, the accessing time is in the order of several hundreds milliseconds. Further, as shown in FIG. 8, no information has stored in the buffer memory 19.

Moreover, the controller 16 closes the signal path e of the switcher 23 for reproduction-use. Therefore, as shown in FIG. 7, the recorded information $a'_{3600}$, $a'_{3601}$, and $a'_{3602}$, which is to be read by the optical pickup 3 from the optical disk 1, that is, from recorded information stored on the second spiral information track 27, is sent through the reproduction amplifier 7 to the reproduced-data processing circuit 12, where it is converted into compressed digital information $a_{3600}$, $a_{3601}$, and $a_{3602}$. Then, as shown in FIG. 8, the information is successively stored in the buffer memory 19 through the signal path e of the switcher 23 for reproduction-use. Thereafter, the optical pickup 3 carries out the accessing operation to the 1st sector of the absolute addresses located on the first spiral information track 26 in response to an instruction given by the controller 16, and enters the stand-by state.

When an instruction for carrying out an reproducing operation is given through the operation section 17, and is entered to the controller 16, the controller 16 closes the signal path f of the switcher 23 for reproduction-use. Next, the optical pickup 3 starts reading, for example, the recorded information $a'_0$ at the 1st sector of the absolute addresses located on the first spiral information track 26. From this time on, the reproducing operation is carried out in the same manner as described in the first embodiment.

As described above, immediately after activating the apparatus, the recorded information located from the 1st sector to the 3rd sector of the absolute addresses on the second spiral information track 27 on the optical disk 1 is preliminarily stored in the buffer memory 19. This process for storing information is recognized by the user as a preparatory process for the activation of the apparatus. With this arrangement, upon starting the reproducing operation, the storing process for the predetermined information on the optical disk 1 has been already completed. Therefore, the reproducing operation is carried out without waiting time, thereby making it possible to improve the operability of the apparatus.

In the present embodiment, the explanation has been given on the case where digital information is successively recorded on the optical disk 1, starting from the first spiral information track 26 over to the second spiral information track 27. However, the present invention may be applied to the case where digital information is successively recorded on the optical disk 1, starting from the second spiral information track 27 over to the first spiral information track 26. In this case, in the reversed manner to the present embodiment, the recorded information located from the 1st sector to the 3rd sector of the absolute addresses on the first spiral information track 26 on the optical disk 1 is preliminarily stored in the buffer memory 19.

Moreover, in the embodiments of the present invention, compressed digital information is used as information to be stored in the buffer memory 19. However, the present invention is not limited to this arrangement; information of another type may be adopted as long as the information corresponds to the predetermined number of blocks from the leading block on the spiral in question. In other words, the types of information may include, for example, recording information, information before being subjected to the processing for recording, compressed digital information as described in the present embodiments, and digital information as it is.

It is possible to adopt an optical disk for recording lands and grooves or an optical disk having tracks in the shape of V-grooves as the recording medium having a plurality of information tracks in the shape of spirals that is used in the present invention. Furthermore, in the present embodiments, an optical disk which has two spiral information tracks is used. However, another optical disk which has three or more spiral information tracks may be adopted.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An information recording-reproduction method comprising the steps of:
   providing a recording-reproduction means for recording digital information on a recording medium that has a plurality of non-contiguous information tracks, each information track having a spiral shape with a plurality of sectors, and a storage means for temporarily storing the digital information;
   operative when the recording-reproduction means successively records continuous digital information on a first information track and a second information track, storing first digital information in the storage means temporarily, the first digital information corresponding to a shifting time of the recording-reproduction means from the first information track to the second information track; and
   recording the first digital information that has been stored in the storage means onto the second information track after a last portion of the digital information has been recorded onto the second information track.

2. The information recording-reproduction method as defined in claim 1, wherein during the recording operation of the digital information, the first digital information is recorded on a first sector corresponding to a predetermined section of the second information track, following a sequence of recording processes that have been made by the recording-reproduction means.

3. The information recording-reproduction method as defined in claim 2, wherein the number of the first sector is determined depending on a period required for the recording-reproduction means to shift from the first information track to the second information track.

4. The information recording-reproduction method as defined in claim 3, wherein the first sector starts from, a leading portion of the second information tracks and when the recording-reproducing means shifts from the first information track to the second information track, it is shifted to a sector position following the first sector in the second information track.

5. The information recording-reproduction method as defined in claim 1, wherein the information tracks are formed on the recording medium from the inside toward the outside, or from the outside toward the inside, in the same circumferential direction.

6. The information recording-reproduction method as defined in claim 1, wherein the information tracks are formed in parallel with each other.

7. The information recording-reproduction method as defined in claim 1, wherein: the recording medium is an magneto-optical disk; the recording-reproduction means is provided with a coil for applying a modulated magnetic field onto the recording medium and an optical pickup for heating a recording portion on the recording medium upon recording information as well as for projecting a light beam onto the recording portion upon reproducing information; the coil and the optical pickup are installed face to face with each other with the recording medium located in between; and the coil and the optical pickup are shifted as one unit in a direction toward the surface of the recording medium.

8. The information recording-reproduction method as defined in claim 1, wherein the digital information has been divided into respective blocks and compressed, depending on a recording capacity of each sector, each block having a code for identifying itself at the end thereof, the method further comprising the step of:

making a switchover according to the code so that, during the shifting time of the recording-reproduction means from the first information track to the second information track, the digital information, which has been inputted to the recording-reproduction means, is inputted to the storage means.

9. The information recording-reproduction method as defined in claim 8, comprising the step of:

making a switchover according to the code so that, after completion of the shift of the recording-reproduction means from the first information track to the second information track, the digital information, which has been inputted to the storage means, is inputted to the recording-reproduction means.

10. A method of recording digital information with a recording element on a recording medium that has a plurality of noncontiguous spiral-shaped tracks, the method comprising:

obtaining a sequence of digital information for recording;

recording, using the recording element, a first portion of the sequence of digital information on a first track;

storing a second portion of the sequence of digital information in a buffer while the recording element is moved from the first track to a second track;

recording a third portion of the sequence of digital information on the second track; and then recording the second portion of the sequence of digital information on the second track in a position on the second track whereby the first, second, and third portions of the sequence are reproducible in sequential order.

11. A method of reproducing digital information using a reproduction element from a recording medium that has at least first and second non-contiguous spiral-shaped tracks, the method comprising:

(1) obtaining and storing, in a buffer, digital information from a predetermined portion of the second track;

(2) obtaining digital information from the first track and converting the obtained digital information from the first track into a usable form;

(3) while moving the recording element from the first track to the second track, converting the digital information obtained and stored in the buffer in step (1) into the usable form;

(4) obtaining and converting into the usable form digital information from the second track which follows in sequence the digital information obtained in step (1).

12. The method of claim 11, wherein the predetermined portion of the second track comprises a sector at a beginning of the second track.

* * * * *